United States Patent [19]
Hasegawa et al.

[11] 3,968,093
[45] July 6, 1976

[54] PROCESS FOR PRODUCING PARTIALLY HYDROLYZED POLYACRYLAMIDE IN THE PRESENCE OF ALKALI METAL HYDROXIDE AND BORIC ACID

[75] Inventors: Masao Hasegawa, Tokyo; Akihisa Furuno; Haruhiko Ishikawa, both of Yokohama; Yasuo Ogawa, Kawasaki, all of Japan

[73] Assignee: Nitto Chemical Industry Co., Ltd., Tokyo, Japan

[22] Filed: May 13, 1974

[21] Appl. No.: 469,443

[30] Foreign Application Priority Data
May 12, 1973  Japan............................... 48-52145
May 12, 1973  Japan............................... 48-52146

[52] U.S. Cl. ....................... 526/303; 162/168 NA; 210/10; 210/54; 260/29.6 H; 526/89; 526/195; 526/304
[51] Int. Cl.² ............... C08F 120/52; C08F 120/70; C02C 1/02; B10D 5/00
[58] Field of Search ............................... 260/89.7 R

[56] References Cited
UNITED STATES PATENTS
2,820,777  1/1958  Suen et al. ..................... 260/89.7 R
3,200,098  8/1965  Goren ............................ 260/80.3
3,414,552  12/1968  Scanley ......................... 260/89.7 R FOREIGN PATENTS OR APPLICATIONS
666,495  7/1963  Canada ............................ 260/89.7

OTHER PUBLICATIONS
Nobuyuki Nakajima, "Fractionation of Linear Polyethylene With Gel Permeation Chromatography Polymer Molecular Wt. Methods," Table I, pp. 98–107.

Primary Examiner—Joseph L. Schofer
Assistant Examiner—Herbert J. Lilling
Attorney, Agent, or Firm—Sughrue, Rothwell, Mion, Zinn & Macpeak

[57] ABSTRACT

A process for producing a partially hydrolyzed polyacrylamide which has a high molecular weight and high water solubility and can be suitably used as a flocculant for water treatment and a size for paper manufacture comprising polymerizing an aqueous solution of an acrylamide monomer in the presence of an alkali metal hydroxide such as sodium hydroxide and boric acid, whereby a partial hydrolysis of the polymer formed is also conducted substantially simultaneously with the polymerization. In an additional embodiment, a maturing of the polyacrylamide produced can be conducted by continuing to heat the polymer solution to increase the hydrolysis percentage.

8 Claims, 1 Drawing Figure

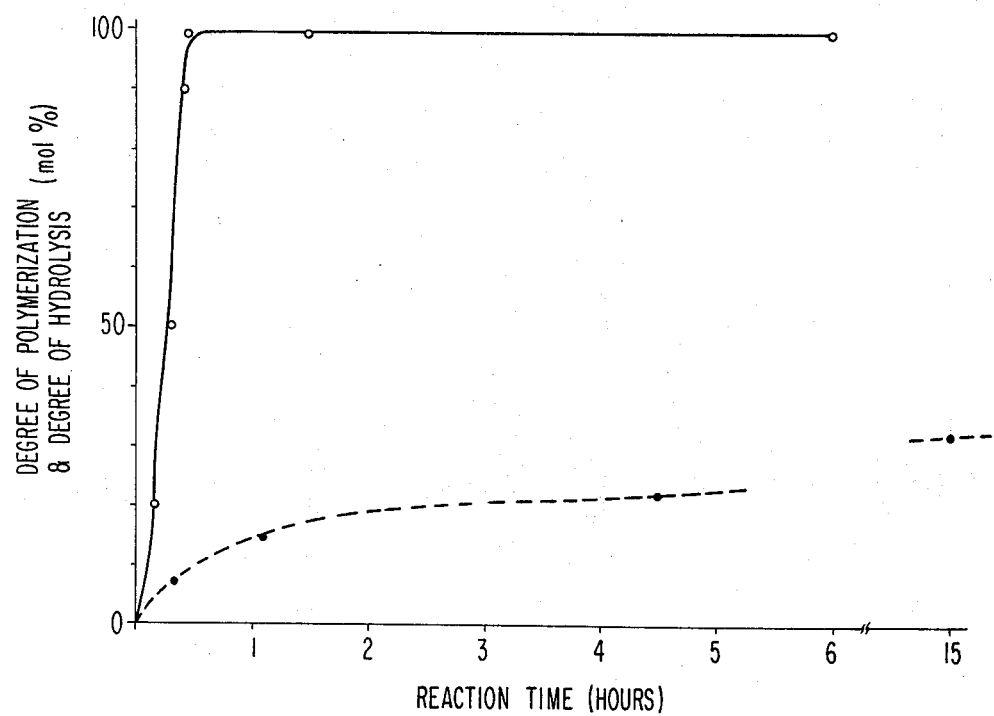

PROCESS FOR PRODUCING PARTIALLY HYDROLYZED POLYACRYLAMIDE IN THE PRESENCE OF ALKALI METAL HYDROXIDE AND BORIC ACID

BACKGROUND OF THE INVENTION

1. Field of the Invention

The present invention relates to a process of producing partially hydrolyzed polyacrylamide which has high solubility in water and can be widely used as, for example, a flocculant for water treatment, a size for paper manufacture, etc. More particularly, the invention relates to an improved process of producing partially hydrolyzed polyacrylamide by polymerizing a highly concentrated aqueous solution of acrylamide monomer in the presence of an alkali such as sodium hydroxide and boric acid to also partially hydrolyze the polymer formed substantially simultaneously with the polymerization.

2. Description of the Prior Art

Polymers prepared by homogeneous-polymerizing in an aqueous medium a monomer capable of forming a water-soluble polymer differ from each other in fluidity depending on the monomer concentration, degree of polymerization, and monomer composition employed for each polymer prepared. From a practical standpoint, acrylamide can be polymerized using various processes but an aqueous solution polymerization process which can be conducted economically and simply and can be used easily to produce a high molecular weight polymer suitable as a flocculant or a dispersing agent has now been employed in various fields. In a polymerization using a solvent or a dispersion medium as in solution polymerization, it is better that a high concentration monomer solution or polymer solution be used from the standpoints of the dimensions of the polymerization apparatus and solvent removal or drying of the polymer solution formed. For example, U.S. Pat. Nos. 3,477,932, and 3,558,759 and British Pat. No. 1,217,552 disclose polymerization of acrylamide at a high concentration in aqueous solution. Furthermore, from the standpoint of facilitating transportation and handling, a polymer powder has been required in place of a low-concentration liquid product which has hitherto been employed. However, polymerization in such a high-concentration monomer solution to meet such requirements is accompanied by other difficulties. For example, the viscosity of the polymer solution increases greatly.

In using polyacrylamide as a flocculant, it has been desired to establish a technique for producing a high molecular weight polyacrylamide having a desired hydrolysis percentage ranging from about 5 mol percent to about 50 mol percent since the flocculation ability of the polymer increases as the molecular weight of the polymer increases and further the suitable percentage of polyacrylamide hydrolyzed depends upon the properties of the suspended material to be flocculated.

In order to obtain a polymer powder by drying an aqueous solution of the polymer, it is obviously desirable to polymerize a monomer at a concentration as high as possible but as described above, polyacrylamide, in particular hydrolyzed polyacrylamide, tends to become quite a viscous liquid or to gel and the concentration of the polymer solution which can be treated as liquid substantially is less than from about 10 to about 15% by weight although this depends upon the degree of polymerization. In particular, for a high molecular weight polyamide having a molecular weight of about 5,000,000 which is usually used as a flocculant, a concentration of about 10% by weight frequently makes it difficult to handle the polymer composition as a liquid.

On the other hand, processes for preparing hydrolyzed polyacrylamide are generally known such as a process in which acrylamide is copolymerized with acrylic acid or a salt thereof and a process in which a homopolymer of acrylamide is prepared and then the homopolymer is hydrolyzed. However, the former process has the disadvantage that it is difficult to obtain a high molecular weight copolymer. Also, in the latter process, when the polymerization is conducted at a monomer concentration of higher than about 10% by weight and in particular higher than about 15% by weight, the polymer obtained is a viscous gel and thus if such a polymer is hydrolyzed in a post treatment (e.g., as disclosed in British Pat. No. 1,217,552), a homogeneous hydrolyzed polymer is not obtained.

Accordingly, in order to obtain a partially hydrolyzed polyamide in a high concentration, the employment of a so-called simultaneous polymerization-hydrolysis process is required wherein the hydrolysis reaction of polyacrylamide is conducted substantially simultaneously with the polymerization of the acrylamide.

The simultaneous polymerization-hydrolysis reaction of acrylamide is known and sodium hydroxide or ammonia is usually used as a hydrolyzing agent, for example, as disclosed in U.S. Pat. Nos. 2,820,777 and 3,200,098 and British Pat. No. 1,242,551. However, when such a hydrolyzing agent is used, a high molecular weight polymer is not obtained and thus various investigations have been made to overcome such a difficulty. For example, a method wherein an alkali metal carbonate is used as the hydrolyzing agent, for example, as disclosed in U.S. Pat. No. 3,022,279, a method wherein (1) an alkali metal hydroxide or an alkali metal carbonate along with (2) an alkali metal sulfate or an alkali metal chloride is used as hydrolyzing agent as disclosed in U.S. Pat. No. 3,414,552, and a method wherein sodium phosphate and sodium borate are used together as the hydrolyzing agent, for example, as disclosed in Japanese Pat. Publiciation No. 890/72, have been proposed.

However, some difficulties are encountered in the use of such hydrolyzing agents as proposed above when the monomer concentration is higher than about 15% by weight although satisfactory results can be obtained when the monomer concentration is comparatively low, for example, at about 10% by weight. For example, when an alkali metal carbonate is used, a water-insoluble polymer is formed to a great extent while when a phosphate and a borate are used together, the phosphate does not dissolve well in an aqueous solution of the monomer at a high concentration state due to the low solubility of the phosphate. These factors make it difficult to provide a highly hydrolyzed product.

SUMMARY OF THE INVENTION

As the results of various investigations to overcome the aforesaid difficulties of the prior art, it has been discovered that quite excellent results are obtained using a combination of an alkali metal hydroxide and boric acid in simultaneously conducting the polymerization and hydrolysis of an aqueous solution of the monomer in a high concentration of higher than about 15% by weight to about 90% by weight, preferably higher than about 18% by weight to about 35% by weight.

That is, according to the present invention a process for producing partially hydrolyzed polyacrylamide having a high molecular weight and good water solubility is provided which comprises polymerizing acrylamide in an aqueous solution in the presence of an alkali metal hydroxide and boric acid, whereby the hydrolysis of the polymer is conducted substantially simultaneously with the polymerization.

BRIEF DESCRIPTION OF THE ACCOMPANYING DRAWING

The DRAWING graphically presents the degree of polymerization and the degree of hydrolysis with respect to time of a polyacrylamide polymer produced in accordance with one embodiment of the invention.

DETAILED DESCRIPTION OF THE INVENTION

The term "partially hydrolyzed polyacrylamide having a high molecular weight and high or good water solubility" as used in this specification means a polyacrylamide having a molecular weight higher than about 5,000,000 up to about 12,000,000 in which the hydrolysis percentage ranges from about 5 mol percent to about 50 mol percent with a viscosity ranging from about 100 to about 1,200 cps, preferably 250 to 900 cps at 25°C (as a 0.1% aqueous solution). The viscosity of the aqueous solution of the partially hydrolyzed polyacrylamide varies depending on the hydrolysis percentage, but with a polymer having a hydrolysis percentage of, for example, about 10 mol percent, the viscosity at 25°C of an aqueous solution of 0.1% by weight of the polymer is higher than about 100 cps (as measured using a Brookfield viscometer, a rotor number No. 1, and a rotation rate of 6 rpm).

The polymerization of an acrylamide monomer in an aqueous medium, practically speaking, an aqueous solution polymerization of acrylamide, is known. Therefore, in the process of this invention, various prior art techniques can be employed. For example, water-soluble peroxide polymerization initiators such as ammonium persulfate, potassium persulfate, etc., oxidation-reduction type polymerization initiators such as a combination of a water-soluble peroxide and a water-soluble tertiary amine, a combination of a water-soluble sulfite and a water-soluble peroxide, a combination of a water-soluble bromate and a water-soluble sulfite, etc., as well as water-soluble azo compounds such as 4,4'-azobis(4-cyanovaleric acid) can be used as the polymerization initiator in the process of this invention. However, oxidation-reduction type polymerization initiators are usually preferred since the heat of polymerization which is generated abruptly can be sufficiently removed. In the polymerization an inert atmosphere such as nitrogen or argon is usually used to blanket the system.

The polymerization temperature can be appropriately selected with polymerization temperatures of about 0° to 55°C, preferably 20° to 40°C being suitable in general but for the reasons stated above, optimum polymerization temperatures for obtaining a polyacrylamide which is most suitable as a flocculant range from 20° to 40°C.

In the process of this invention, the polymerization of acrylamide and the hydrolysis of the polyacrylamide formed are conducted substantially simultaneously using an alkali metal hydroxide, e.g., sodium hydroxide or potassium hydroxide, with generally sodium hydroxide being used, and boric acid and the percentage of the polyacrylamide hydrolyzed is controlled by the alkali metal hydroxide content. In the case of hydrolyzing polyacrylamide, the alkali metal hydroxide is used in a theoretical amount necessary for obtaining a desired hydrolysis percentage. For example, for a hydrolysis percentage of about 10% a suitable alkali metal hydroxide to acrylamide molar ratio is about 0.09 and for a hydrolysis percentage of about 30% a suitable alkali metal hydroxide molar ratio is about 0.25.

When the inside temperature of the polymerization system reaches the maximum temperature due to the heat of polymerization, the polymerization reaction of acrylamide is almost finished, which is the end point of the polymerization in the process of this invention. Practically speaking, at this point, the conversion of the monomer is about 98 to about 99% or more and the contents of the polymerization vessel is a gel having a high tackiness or viscoelasticity.

Boric acid influences the molecular weight of the polymer obtained, that is, the molecular weight of the polymer is increased as the amount of boric acid is increased. Although the reason for the above has not yet been completely clarified, it is believed that although ammonia formed by the hydrolysis reaction and also tertiary amines such as nitrilotrispropionic acid amide which is a reaction product of ammonia thus formed and acrylamide act to reduce the molecular weight of the polymer formed, the boric acid has the action of suppressing the formation of these materials or fixing these materials.

The amounts of the alkali metal hydroxide and boric acid which can be suitably used are described below. That is, the alkali metal hydroxide is used in an amount required for obtaining a polyacrylamide having the desired hydrolysis percentage and furthermore, more preferable results are obtained, as shown in the examples of this invention given hereinafter, when boric acid is used in an almost equimolar amount to the alkali metal hydroxide.

In the practice of the simultaneous polymerization-hydrolysis reaction of a highly concentrated aqueous solution of acrylamide and the hydrolysis of the formed polymer according to the process of this invention, the amounts of MOH (wherein M represents an alkali metal such as sodium or potassium) and $H_3BO_3$ are controlled so that the molar ratio of $MOH/H_3BO_3$ ranges from about 0.5 to 1.5, preferably 0.8 to 1.3, although the molar ratio varies depending on the concentration of the monomer. In this case, if the amount of boric acid is less than the aforesaid range, the molecular weight of the polymer formed becomes lower, while if the amount thereof is higher than this range, the formation of water-insoluble materials occurs in the polymer formed, resulting in a reduction of the solubility of the polymer product in water.

Thus, by polymerizing acrylamide in a highly concentrated aqueous solution thereof according to the process of this invention, a polyacrylamide having the desired hydrolysis degree is obtained. However, in the case of preparing a polyacrylamide having a hydrolysis percentage of, for example, 35 to 50 mol percent, where the alkali metal hydroxide in an amount required for providing this hydrolysis percentage and boric acid in an almost equimolar amount to the alkali metal hydroxide are used, a reduction relatively in the purity of the polyacrylamide formed results.

Further investigations of these problems have been made and it has been found that by further maturing the gel-like polymer thus obtained under heating, the hydrolysis percentage of the polymer can be increased.

That is, in conducting the simultaneous polymerization-hydrolysis reaction of this invention, after the internal temperature of the polymerization system has reached the maximum temperature (the monomer conversion is about 99% at this point), the polymer thus formed can be further matured for an appropriate period of time at an appropriate temperature. The maturing temperature is usually higher than about 75°C, and preferably ranges from about 80°C to about 100°C. If the maturing temperature is lower than that described above, an insufficient maturing effect is obtained and thus a sufficient hydrolysis percentage does not result. On the other hand, if the maturing temperature is higher than about 100°C, the aqueous solution of the polymer boils and thus the reaction cannot be practiced in an ordinary vessel or must be conducted in a pressure vessel. In addition, undesirable side reactions such as the imidation of the polymer occur.

The hydrolysis reaction by maturing under heating proceeds in almost linear relation with time at a specific temperature. For example, an aqueous acrylamide solution comprising 25% by weight acrylamide and 75% by weight water was polymerized at 30°C in the presence of 1.27% by weight (to the solution weight) sodium hydroxide, 1.5% by weight boric acid (the molar ratio of $NaOH/H_3BO_3$ being about 1.31), 0.01% by weight potassium peroxide, and 0.01% by weight dimethylaminopropionitrile and after the internal temperature of the polymerization system reached a peak temperature of 97°C, the product system was matured at a jacket temperature of 95°C, whereby the change in the hydrolysis percentage of the polymer obtained with the passage of time was observed. The results obtained are shown in the following table.

|  | Maturing Period (minutes) | | | |
| --- | --- | --- | --- | --- |
|  | 40 | 230 | 320 | 860 |
| Hydrolysis Percentage (mole %) | 15 | 22 | 25 | 32 |

The results obtained are shown graphically in the accompanying drawing together with conversion of the polymerization percentage of the monomer. In the graph, the solid line represents the polymerization percentage of conversion of the acrylamide and the dotted line represents the hydrolysis percentage of polyacrylamide plotted with respect to time.

As is clear from the results shown in the graph, when the internal temperature of the polymerization system reached the maximum temperature due to the heat of polymerization, the conversion of the acrylamide had proceeded to an extent of about 100% but the hydrolysis percentage of the polymer at that time was slight. On the other hand, in conducting the heat treatment of the water-containing and gel-like polyacrylamide, only the hydrolysis reaction occurred as a matter of fact and no side reaction occurred or if they did occur, the extent of such could be ignored.

The heat maturing conditions can be easily selected by conducting preliminary testing and hence if the hydrolysis percentage of the acrylamide polymer at the completion of the polymerization and at the start of the heat maturation is measured, an acrylamide polymer having a desired hydrolysis percentage can be obtained by controlling the maturing period of time and maturing temperature. The maturing of the acrylamide polymer formed is not required in all instances. That is, where the hydrolysis percentage is low, the maturing is sometimes not needed and can be omitted. The use of maturing varies depending upon desired purity of the final product, the amount of alkali added, etc. Where maturing is employed, the time for maturing is preferably 4 to 20 hours.

By practicing the process of this invention as described above, the polymerization of a highly concentrated aqueous solution of an acrylamide monomer and the hydrolysis of the polymer formed can be simultaneously conducted and thus partially hydrolyzed polyacrylamide having a hydrolysis percentage as desired can be easily produced.

The following examples are given to illustrate the present invention in greater detail but are not intended to limit the invention in any way. Unless otherwise indicated, all parts, percents, ratios and the like are by weight.

EXAMPLE 1

In 380 ml of pure water was dissolved 230 g of a crystalline acrylamide monomer and after adding to the solution an aqueous solution of sodium hydroxide and boric acid in the molar ratio set forth in table shown below in 370 ml of water, the mixture was heated to 27°C. Then, the mixture was placed in a Dewar vessel equipped with a thermometer, a nitrogen inlet pipe, a nitrogen outlet pipe and an inlet for the catalyst and then nitrogen was passed into the vessel for 30 minutes. Then, 10 ml of an aqueous solution containing 0.1 g of dimethylaminopropionitrile was added to the mixture and 5 minutes later, 10 ml of an aqueous solution containing 0.1 g of potassium persulfate was added thereto. After 5 minutes, a nitrogen displacement was conducted and then the vessel was closed. In this case the temperature in the vessel was 25°C but within 10 – 20 minutes from the addition of the potassium persulfate, the temperature in the vessel began to increase and reached about 90°C. after about one hour.

The product was then cooled to room temperature. The elastic gel-like polymer formed was withdrawn from the vessel and cut into small pieces a few mm in length. The pieces of the polymer were placed in pure water followed by stirring overnight to provide a 0.1% aqueous solution of the polymer and then the viscosity of the solution and the hydrolysis percentage of the polymer were measured. The viscosity of the solution was measured at 25°C using a Brookfield viscometer, a No. 1 rotor and a rate at 6 rpm. The hydrolysis percentage was measured by potentiometric titration and was calculated from the value of the number of milliliters of 0.1 normal sodium hydroxide solution.

The high molecular weight polymer obtained was a gel and by slicing the polymer and subjecting the sliced polymer directly to air drying at 60° to 100°C, the polymer could be dried in a short period of time.

| | NaOH (g) | H₃BO₃ (g) | (A) | (B) (C°) | Polymer Properties | | |
|---|---|---|---|---|---|---|---|
| | | | | | (C) | (D) (%) | (E) (cps) |
| 1-1 | 38.8 | 55.0 | 1.09 | 92 | Soluble | 31.2 | 352 |
| -2 | " | 59.0 | 1.02 | 89 | " | 32.7 | 657 |
| -3 | " | 63.0 | 0.95 | 91 | " | 33.3 | 850 |
| -4 | " | 67.0 | 0.90 | 91 | Insoluble | — | — |
| -5 | " | 71.0 | 0.85 | 89 | " | — | — |
| -6 | " | 0 | — | 91 | Soluble | 30.8 | 32 |

(A): Molar ratio of NaOH/H₃BO₃
(B): Polymerization peak temperature
(C): Solubility in water
(D): Hydrolysis percentage
(E): Viscosity

REFERENCE EXAMPLE

The solution viscosity (cps) of a 0.1% aqueous solution of a partially hydrolyzed polyacrylamide having a known molecular weight was measured and the results obtained are shown in the following table for explaining the effect and advantages of this invention.

| Molecular Weight | Hydrolysis Percentage | | | |
|---|---|---|---|---|
| | 5 | 10 | 20 | 30 |
| 4,500,000 | 19 | 130 | 290 | 430 |
| 8,100,000 | 250 | 370 | 720 | 980 |

EXAMPLE 2

The same procedure as described in Example 1 was followed except that an aqueous solution of 250 g of acrylamide in 750 ml of water was used and further a polymerization initiation temperature of 30°C was employed. The results obtained are shown in the following table.

| | NaOH (g) | H₃BO₃ (g) | (A) | (B) (C°) | Polymer Properties | | |
|---|---|---|---|---|---|---|---|
| | | | | | (C) | (D) (%) | (E) (cps) |
| 2-1 | 4.0 | 6.0 | 1.03 | 100 | Soluble | 13.0 | 542 |
| -2 | 11.3 | 16.0 | 1.09 | 99 | " | 20.5 | 790 |
| -3 | 28.2 | 40.0 | 1.09 | 98 | " | 28.4 | 746 |

(A), (B), (C), (D), and (E) have the same meaning as in the table in Example 1.

EXAMPLE 3

In 400 ml of ion-exchange water was dissolved 230 g of acrylamide and the solution was placed in a 2-liter Dewar vessel. Then 350 ml of ion-exchange water having dissolved therein 8 g of sodium hydroxide and 11 g of boric acid was added to the aqueous acrylamide solution. After sufficiently displacing the air in the vessel with nitrogen gas and while adjusting the temperature of the solution mixture to 28°C, 10 ml of a 1.0% aqueous potassium persulfate solution and 10 ml of a 1.0% aqueous solution of dimethylaminopropionitrile were added to the solution. After an induction period of about 20 minutes, the polymerization abruptly started, an increase in the temperature of the polymerization system was observed, and the temperature of the system reached a maximum temperature of 96.5°C after 40 minutes. At this point, the gel-like polymer thus formed was withdrawn and divided into five portions. One portion was cooled and the other portions were heated in an air bath at 95°C. The hydrolysis percentage of the polymer and the apparent viscosity of a 0.1% aqueous solution of the polymer (using a Brookfield viscometer, rotor No. 1, at 6 rpm) changed as the heating period of time passed as shown in the following table.

| Heating Period (hour) | Hydrolysis Percentage (mol %) | 0.1% Viscosity (cps) |
|---|---|---|
| 0 | 8.4 | 290 |
| 2 | 12.4 | 430 |
| 4 | 14.3 | 600 |
| 10 | 21.9 | 820 |
| 16 | 25.0 | 860 |

EXAMPLES 4-6

To a polymerization system of 23% acrylamide and 77% water were added 0.01% (to the solution weight) potassium persulfate and 0.01% dimethylaminopropionitrile and then the polymerization was conducted at a polymerization initiation temperature of 30°C in the same manner as described in Example 3. In this case, the properties of the polymers formed when the amounts of sodium hydroxide and boric acid added were changed were measured. The results obtained are shown in the following table. In addition, the maturing of the polymer was conducted at 95°C.

| Example | H₃BO₃ (%) | NaOH (%) | (B) (°C) | (F) (%) | (G) (hour) | (H) (mol%) | (I) (cps) |
|---|---|---|---|---|---|---|---|
| 4 | 0.25 | 0.2 | 99 | 99.5 | 0 | 4.4 | 210 |
| " | " | " | " | " | 5 | 14.5 | 650 |
| " | " | " | " | " | 10 | 19.7 | 700 |
| 5 | 2.1 | 1.5 | 98 | 99.6 | 0 | 15.5 | 630 |
| " | " | " | " | " | 5 | 20.1 | 740 |
| " | " | " | " | " | 10 | 28.8 | 850 |
| " | " | " | " | " | 20 | 33.9 | 900 |
| 6 | 7.0 | 4.7 | 92 | 99.1 | 5 | 25.1 | 770 |
| " | " | " | " | " | 10 | 37.8 | 980 |
| " | " | " | " | " | 16 | 47.0 | 1120 |

(B): Polymerization peak temperature of the polymerization
(F): Conversion of monomer
(G): Heating period of time after polymerization
(H): Hydrolysis percentage of the polymer
(I): Viscosity of a 0.1% aqueous solution of the polymer While the invention has been described in detail and with reference to specific embodiments thereof, it will be apparent to one skilled in the art that various changes and modifications can be made therein without departing from the spirit and scope thereof.

What is claimed is:

1. A process for producing partially hydrolyzed polyacrylamide, which comprises polymerizing acrylamide monomer in an aqueous solution in the presence of alkali metal hydroxide and boric acid, whereby the polymer formed is also hydrolyzed simultaneously with said polymerizing and the resulting polymer is of high molecular weight and high water solubility.

2. The process as claimed in claim 1, wherein the concentration of said acrylamide monomer in said aqueous solution is higher than about 18% by weight.

3. The process as claimed in claim 1, wherein the molar ratio of said alkali metal hydroxide to boric acid is from about 0.8 to about 1.3.

4. The process as claimed in claim 1, wherein said partially hydrolyzed polyacrylamide is produced as a gel-like polymer having a high tackiness or viscoelasticity.

5. The process as claimed in claim 4, including further heating said gel-like polymer to increase the hydrolysis percentage thereof.

6. The process as claimed in claim 5, wherein the further heating of the gel-like polymer is at temperatures of from about 75°C to about 100°C.

7. The process as claimed in claim 5, wherein the further heating of the gel-like polymer is at temperatures of from about 80° to about 100°C.

8. The process as claimed in claim 5, wherein said further heating is for a period of 4 to 20 hours.

* * * * *